US008433907B2

(12) United States Patent
Hjelm et al.

(10) Patent No.: US 8,433,907 B2
(45) Date of Patent: Apr. 30, 2013

(54) APPLICATION SERVER, CONTROL METHOD THEREOF, PROGRAM, AND COMPUTER-READABLE STORAGE MEDIUM

(75) Inventors: Johan Hjelm, Tokyo (JP); Hajime Kasahara, Yokohama (JP); Shingo Murakami, Kanagawa (JP); Toshikane Oda, Tokyo (JP)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 223 days.

(21) Appl. No.: 13/061,882

(22) PCT Filed: Sep. 5, 2008

(86) PCT No.: PCT/SE2008/050999
§ 371 (c)(1),
(2), (4) Date: Mar. 2, 2011

(87) PCT Pub. No.: WO2010/027309
PCT Pub. Date: Mar. 11, 2010

(65) Prior Publication Data
US 2011/0179273 A1 Jul. 21, 2011

(51) Int. Cl.
*H04L 9/32* (2006.01)
(52) U.S. Cl.
USPC .......................................................... 713/168
(58) Field of Classification Search ................... 713/168
See application file for complete search history.

(56) References Cited

U.S. PATENT DOCUMENTS

| 2002/0196937 A1* | 12/2002 | Probst ........................... 380/201 |
| 2004/0162910 A1 | 8/2004 | Kryeziu |
| 2005/0005146 A1 | 1/2005 | Kryeziu |

FOREIGN PATENT DOCUMENTS

| WO | WO 2005/107259 | 11/2005 |
| WO | WO 2007/085186 A1 | 8/2007 |

OTHER PUBLICATIONS

International Preliminary Report on Patentability corresponding to PCT/SE2008/050999, Date of Completion: Sep. 3, 2010.
International Search Report corresponding to PCT Application No. PCT/SE2008/050999, Date of Mailing: Jan. 14, 2009.
Melanchuk et al. "An Architectural Framework for Media Server Control draft-ietf-mediactrl-architecture-03" IETF Standard-Working-Draft, Internet Engineering Task Force, pp. 1-33, Apr. 16, 2008.
Wikipedia "Definition of Session Key and Traffic Encryption Key (TEK)" Wikipedia Article Online, 1 page, Aug. 13, 2008.

\* cited by examiner

*Primary Examiner* — Jacob Lipman
(74) *Attorney, Agent, or Firm* — Myers Bigel Sibley & Sajovec, P.A.

(57) ABSTRACT

An application server (100) includes: receiving means (101) for receiving a request for a media object from a user equipment; verification means (102) for verifying the authenticity of the received request; first generation means (103) for generating a session key that is associated with an existing session if the authenticity of the request is successfully verified; first sending means (104) for sending the session key to a media server so that said media server encrypts the requested media object with the session key and sends the encrypted media object toward the user equipment; second generation means (105) for generating a one-time player in which the session key is embedded; and second sending means (106) for sending the one-time player to the user equipment, which enables said user equipment to decrypt and decode the encrypted media object that is sent from the media server.

23 Claims, 9 Drawing Sheets

APPLICATION SERVER, CONTROL METHOD THEREOF, PROGRAM, AND COMPUTER-READABLE STORAGE MEDIUM

CROSS REFERENCE TO RELATED APPLICATION

This application is a 35 U.S.C. §371 national stage application of PCT International Application No. PCT/SE2008/050999, filed on 5 Sep. 2008, the disclosure and content of which is incorporated by reference herein in its entirety. The above-referenced PCT International Application was published in the English language as International Publication No. WO 2010/027309 A1 on 11 Mar. 2010.

TECHNICAL FIELD

The present invention relates to an application server and a control method thereof, a program, and a computer-readable storage medium, and in particular to a DRM mechanism in a media delivery system using an IP Multimedia Subsystem (IMS) network.

BACKGROUND

IP Multimedia Subsystem (IMS) is a communication architecture that has been developed by the Third Generation Partnership Project (3GPP) as an open standard for handling various multimedia applications and sessions in the IP (Internet Protocol) packet domain (for details regarding IMS, please refer to http://www.3gpp.org/ftp/Specs/html-info/23228.htm). IMS manages the signaling between different communication devices, including mobile phones, personal computers (PC), personal digital assistants (PDA) and the like, by creating IMS sessions, which are authenticated and authorized. In this way the IMS system sets up a session through a number of different nodes between the initiator and the receiver over cellular network(s) and the Internet. In addition, IMS provides communication services such as QoS (Quality of Service), billing, and integration of different services.

Multimedia distribution such as IPTV (Internet Protocol Television) is one of the major IMS applications. In a digital media distribution system, digital rights management (DRM) technologies for controlling use of digital media are important for maintaining an orderly digital media distribution market. Particularly for "pay-per-view" services, it is desirable to be able to ensure that the digital media is neither re-usable nor redistributable after the expiry of a session. However, IMS itself does not provide such a DRM mechanism.

United States Patent Application Publication No. US 2005/0005146 A1 describes a system for automatically authenticating media stream recipients. In the authentication system, a media stream includes a self-installing and self-executing media player and media content. The media player communicates with an authentication service to acquire an authentication token. The authentication token is used by the media player in order to obtain access to and play media content on behalf of an authorized recipient. Authentication of media recipients effectively prohibits unauthorized clients from illegitimately receiving media objects. However, US 2005/0005146 A1 does not handle the problem of prohibiting authorized recipients from replaying or redistributing media objects after expiry of a given session.

The Open Mobile Alliance (OMA) DRM specification Candidate Version 2.0 (which can be downloaded from http://member.openmobilealliance.org/ftp/Public documents/DRM/), Appendix C, describes a general concept of applying OMA DRM to streaming services. Moreover, 3GPP Technical Specification titled Transparent End-to-End Packet-switched Streaming Service (PSS), Protocols and Codecs, Release 7 (which can be downloaded from http://www.3gpp.org/ftp/Specs/archive/26_series/26.234/) describes the end-to-end packet switched service standard from 3GPP, and Annex K describes a mechanism to encrypt the content of a media stream (RTP payload and so on). However, these documents do not describe any specific constructions regarding copyright protection for distributed media objects after session expiry and, in particular, do not describe any specific constructions regarding copyright protection for streaming media objects.

SUMMARY

The present invention is intended to address the above-described problem, and it is a feature thereof to introduce a technology for ensuring that the digital media is neither re-usable nor redistributable in an IMS-based media distribution system after the expiry of the IMS session.

According to first aspect of the present invention, there is provided an application server which includes: receiving means for receiving a request for a media object from user equipment; verification means for verifying the authenticity of the received request; first generation means for generating a session key that is associated with an existing session if the authenticity of the request is successfully verified; first sending means for sending the session key to a media server so that said media server encrypts the requested media object with the session key and sends the encrypted media object toward the user equipment; second generation means for generating a one-time player in which the session key is embedded; and second sending means for sending the one-time player to the user equipment, which enables said user equipment to decrypt and decode the encrypted media object that is sent from the media server.

According to second aspect of the present invention, there is provided a method for controlling an application server, including the steps of: receiving a request for a media object from user equipment; verifying the authenticity of the received request; generating a session key that is associated with an existing session if the authenticity of the request is successfully verified; sending the session key to a media server so that said media server encrypts the requested media object with the session key and sends the encrypted media object toward the user equipment; generating a one-time player in which the session key is embedded; and sending the one-time player to the user equipment, which enables said user equipment to decrypt and decode the encrypted media object that is sent from the media server.

The main advantage of the present invention is as follows. Since the application server according to the present invention generates a session key that is associated with an existing session and is used for encrypting a media object, and sends to the user equipment a one-time player in which the session key is embedded, it is ensured that the digital media is neither re-usable nor redistributable in an IMS-based media distribution system after the expiry of the existing session.

Further features of the present invention will become apparent from the following description of exemplary embodiments with reference to the attached drawings, in which like reference characters designate the same or similar parts throughout the figures thereof.

DETAILED DESCRIPTION

Preferred embodiments of the present invention will now be described in detail with reference to the accompanying drawings. It should be noted that the constituents described in this embodiment are exemplary and that the scope of the present invention is not limited solely to these constituents.

A media distribution system according to one exemplary embodiment of the present invention applies a digital rights management (DRM) scheme to an Internet Protocol Television (IPTV) system by ensuring that client software modules used to play the media object are not re-usable after the expiry of the current session. In the media distribution system, a one-time player with a session-dependent key is created, and transmitted to the client device using the SIP/IMS (Session Initiation Protocol/IP Multimedia Subsystem) exchange. The media object is encrypted with the same session-dependent key. The download or push of the one-time player is done as part of the session. This document also describes how SIP/IMS signaling can be used to manage the renewal of the one-time player without interrupting the media distribution.

Further features of the present invention will become apparent from the following description of exemplary embodiments (with reference to the attached drawings).

(Media Distribution System)

Figure 1:
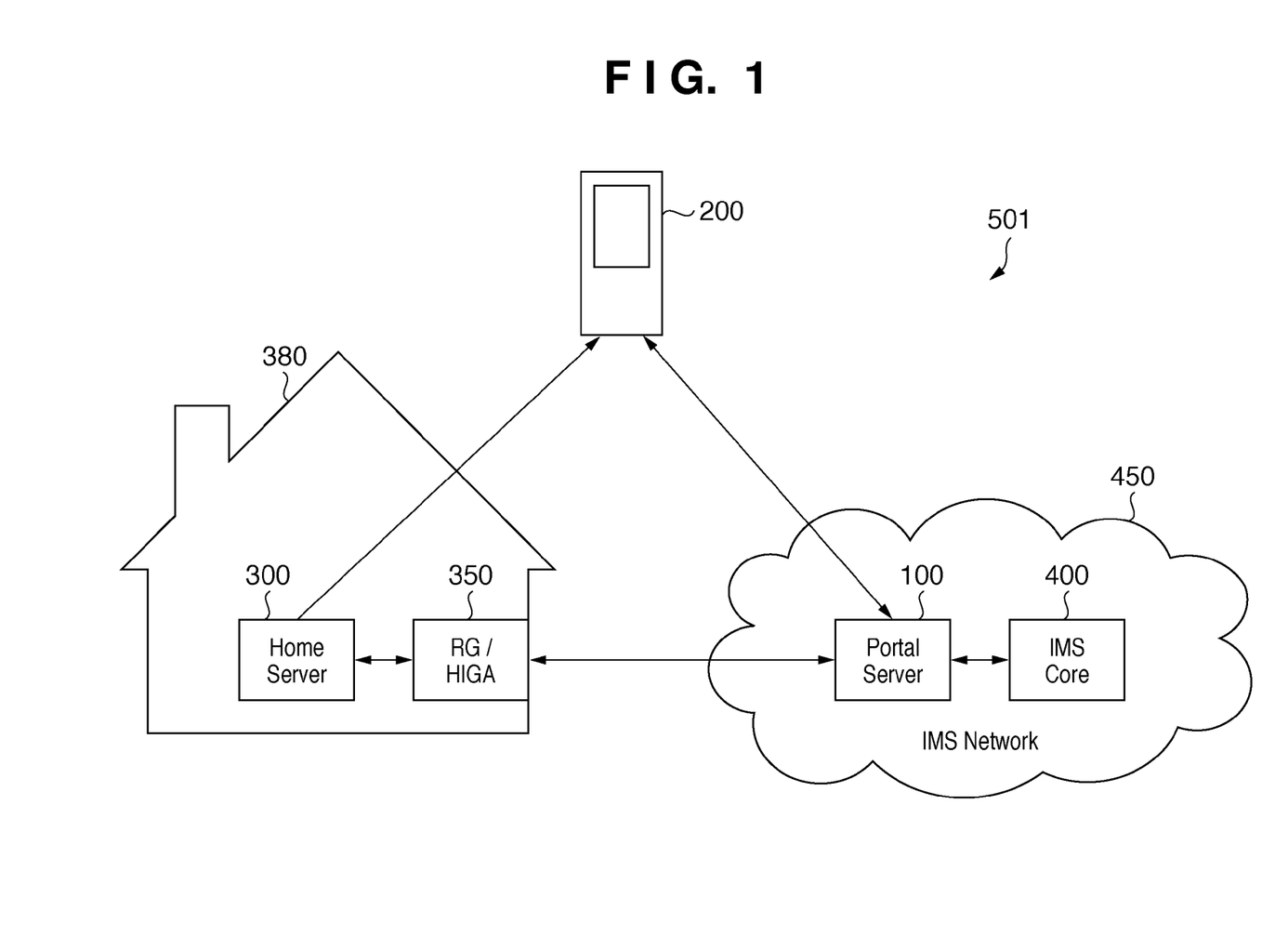
FIG. 1 illustrates an exemplified media distribution system.

FIG. 1 illustrates an exemplified media distribution system 501 according to the exemplary embodiment of the present invention. As illustrated in FIG. 1, the media distribution system 501 includes a portal server 100, user equipment (UE) 200, and a home server 300. The embodiment assumes a residential network scenario, that is, the UE 200 accesses the home server 300 that is typically located in a residential area 380. Some kind of remote connection may have been established in advance, but it should be noted that this media distribution system 501 may function as an alternative to a remote access system, under the condition that the UE 200 and its user is authenticated in a trusted and secure way.

The portal server 100 is an IP Multimedia Subsystem (IMS) application server (AS) in an IMS network 450, which intermediates between the UE 200 and the home server 300 via a residential gateway/home IMS gateway (RG/HIGA) 350. On receiving a request for a media object from the UE 200, the portal server 100 verifies the authenticity of the request. If the authenticity of the request is successfully verified, the portal server 100 generates a session key that is associated with the current session (IMS or SIP session), and sends the session key to the home server 300 so that the home server 300 encrypts the requested media object with the session key. Then, the portal server 100 generates a one-time player embedding the session key, and sends the one-time player to the UE 200, which allows the UE 200 to decrypt and decode the encrypted media object that is to be sent from the home server 300.

The portal server 100 may include a SIP Back-to-Back User Agent (B2BUA) for communications between non-IMS terminals including the UE 200, and the IMS network 450. The portal server 100 may be implemented in a personal computer (PC), a workstation (WS), or the like.

The IMS network 450 includes an IMS core 400, which is an essential component for realizing the IMS network 450. The IMS core 400 may include Call Session Control Functions (CSCFs), which are SIP servers controlling sessions established between terminals in SIP communication and accessing Application Servers (ASs) including the portal server 100 to initiate certain services. The CSCFs are connected over a certain network to the RG/HIGA 350. The CSCFs may include a Proxy CSCF (P-CSCF), an Interrogating CSCF (I-CSCF) and/or a Serving CSCF (S-CSCF). The AS is a server that provides various applications to user equipment 200. In addition, the IMS core may include a Home Subscriber Server (HSS), a Subscription Locator Function (SLF), IMS Enablers, and/or a Multimedia Resource Function (MRF).

The user equipment (UE) 200 is a client device used by a user for playing and/or reproducing the media objects. The UE 200 may be implemented as a mobile phone, a cellular handset, a personal digital assistance (PDA), a laptop PC or the like. When inputting an instruction for obtaining a media object from a user, the UE 200 generates a request for the media object and sends it to the portal server 100. If the UE 200 receives a one-time player from the portal server 200 and an encrypted media object from the home server 300, then it uses the one-time player to decrypt and play the media object.

The home server 300 is a media server for sending an encrypted media object to the UE 200 that has sent a request for the media object to the portal server 100. Specifically, the home server 300 receives the request that originated from the UE 200 including an IP address of the UE 200 and an identifier of the requested media object, and a session key that is generated by the portal server 100, then encrypts the requested media object with the session key, and sends the encrypted media object to the IP address. The home server 300 may be implemented in a personal computer (PC), a workstation (WS), or the like. The type of the media object to be distributed may include both streaming and download data, but as a non-limiting example, in this embodiment, the type of media object to be distributed may be streaming media including video data, audio data or the like.

Since in this example the home server 300 is not an IMS terminal, the communications between the home server 300 and the portal server 100 are interfaced by the RG/HIGA 350. The RG/HIGA 350 is a multimedia gateway, which enables non-IMS terminals to access the IMS network 450. The RG/HIGA 350 is located in a private network (i.e., residential area 380), to which at least one non-IMS terminal is connected. The HIGA includes a SIP B2BUA for communications between non-IMS terminals and the IMS network 450. The HIGA also includes a SIP gateway (implemented according to 3GPP TS 24.229 and IETF RFC 3261). The SIP gateway allows inter-operation between various client terminal signaling protocols and the SIP used by the IMS. For example, the SIP gateway may provide translation between ISDN-based signaling protocols and the SIP. Accordingly, the non-IMS terminals may or may not have SIP functionality.

It should be noted that each arrow depicted in accompanying drawings shows main data flow as a non-limiting example, and thus some data may flow adversely to the orientation of the arrow. In addition, the portal server 100, the UE 200, the home server 300, RG/HIGA 350, and the IMS core 400 are interconnected via at least one certain type of network (not shown), such as a broadband access network including a xDSL (Digital Subscriber Line) network, a optical fiber network, a cable network and so on, and a cellular network including a WCDMA (Wideband Code Division Multiple Access) mobile network, a 3G network, a CDMA 2000 network and so on.

(Portal Server)

Figure 2:
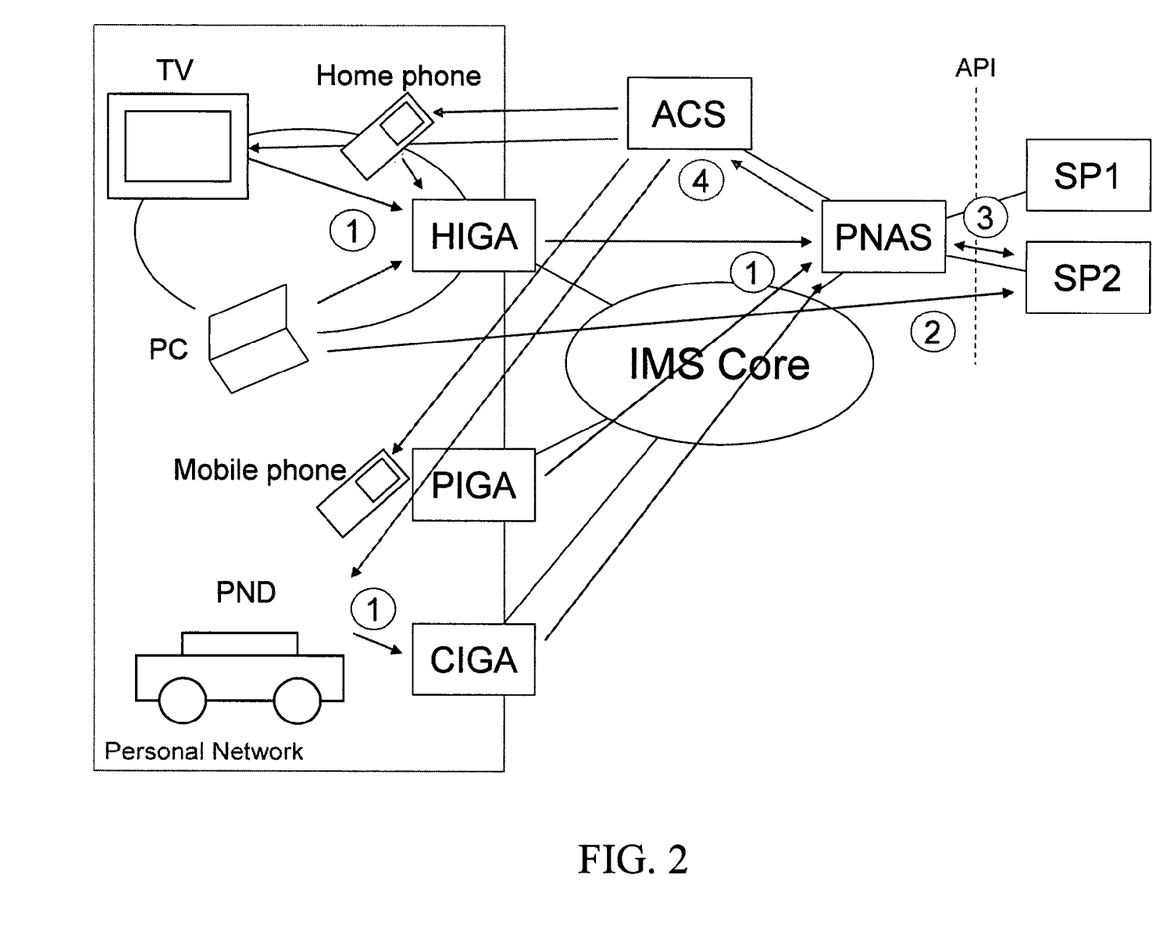
FIG. 2 illustrates a block diagram showing an exemplified functional arrangement of the portal server.

FIG. 2 illustrates a block diagram showing an exemplified functional arrangement of the portal server 100. As shown in FIG. 2, the portal server 100 includes a request receiving unit 101, a verification unit 102, a session key generation unit 103, a session key sending unit 104, a player generation unit 105, and a player sending unit 106.

The CPU (Central Processing Unit) of the portal server 100 may execute a program loaded in a RAM (Random Access Memory) and cooperate with the hardware, thereby implementing the functional elements 101 to 106 shown in FIG. 2. Some or all of the functional elements may be implemented by dedicated hardware, as a matter of course.

The request receiving unit 101 is a functional element that is configured to receive a request for a media object from the UE 200, for example, via a communication interface mounted in the portal server 100. On receiving the request, the request receiving unit 101 passes it to the verification unit 102.

The verification unit 102 is a functional element that is configured to verify the authenticity of the received request that is passed from the request receiving unit 101. In one preferable embodiment, the verification unit 102 may verify the authenticity by interacting with a CSCF in the IMS core 400, the details of which are to be described later. If the authenticity is successfully verified, the verification unit 102 notifies the session key generation unit 103 of the result of the verification and passes the request to it.

The session key generation unit 103 is a functional element that is configured to generate a session key associated with a current session if the authenticity of the request is successfully verified by the verification unit 102. The session key generation unit 103 may generate the session key using a known random number generation algorithm. The generated session key is passed to the session key sending unit 104 and the player generation unit 105.

The session key sending unit 104 is a functional element that is configured to send the session key to a media server 300, which is given as the home server in this embodiment. The session key sending unit 104 also notifies the media server 300 of the contents of the request including the identifier of the requested media object, and IP address of the UE 200 requesting the media object. As described later in detail, the media server 300 encrypts the requested media object with the session key and sends the encrypted media object toward the UE 200.

The player generation unit 105 is a functional element that is configured to generate a one-time player in which the session key is embedded, wherein the session key is the same as the key that is sent to the media server 300. The one-time player is used for decrypting, decoding, and playing the encrypted media object at the UE 200. The one-time player can be implemented for example as a Java applet. The player generation unit 105 passes the generated one-time player to the player sending unit 1061

The player sending unit 106 is a functional element that is configured to send the one-time player generated by the player generation unit 105 to the user equipment 200.

(User Equipment)

Figure 3:
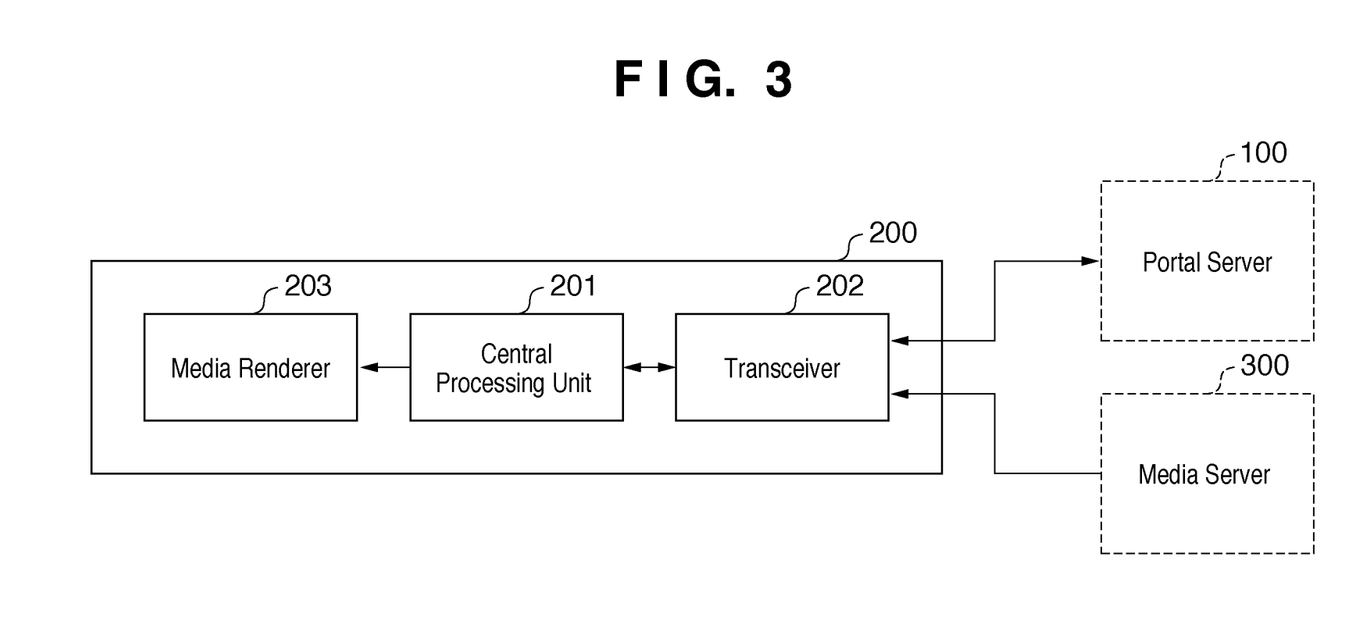
FIG. 3 illustrates a block diagram showing an exemplified functional arrangement of the user equipment.

FIG. 3 illustrates a block diagram showing an exemplified functional arrangement of the user equipment (UE) 200. As shown in FIG. 3, the UE 200 includes a central processing unit (CPU) 201, a transceiver 202, and a media renderer 203.

The CPU 201 is a functional element that is configured to perform various controls and processes of the UE 200. In the present embodiment, the CPU 201 provides an execution environment for executing the one-time player. The CPU 201 of the UE 200 may execute a program loaded in a RAM and cooperate with the hardware, thereby implementing the functional elements 201 to 203 shown in FIG. 3. Some or all of the functional elements may be implemented by dedicated hardware, as a matter of course.

The transceiver 202 is a functional element that is configured to send to and/or receive from data external devices (including the portal server 100 and the media server 300) over traffic channels or control channels.

The media renderer 203 is a functional element that is configured to render the media object, which is decrypted, decoded, and played by the one-time player. For example, the rendered screen may be displayed at a monitor and/or the rendered audio signal may be played back via a speaker.

(Media Server)

Figure 4:
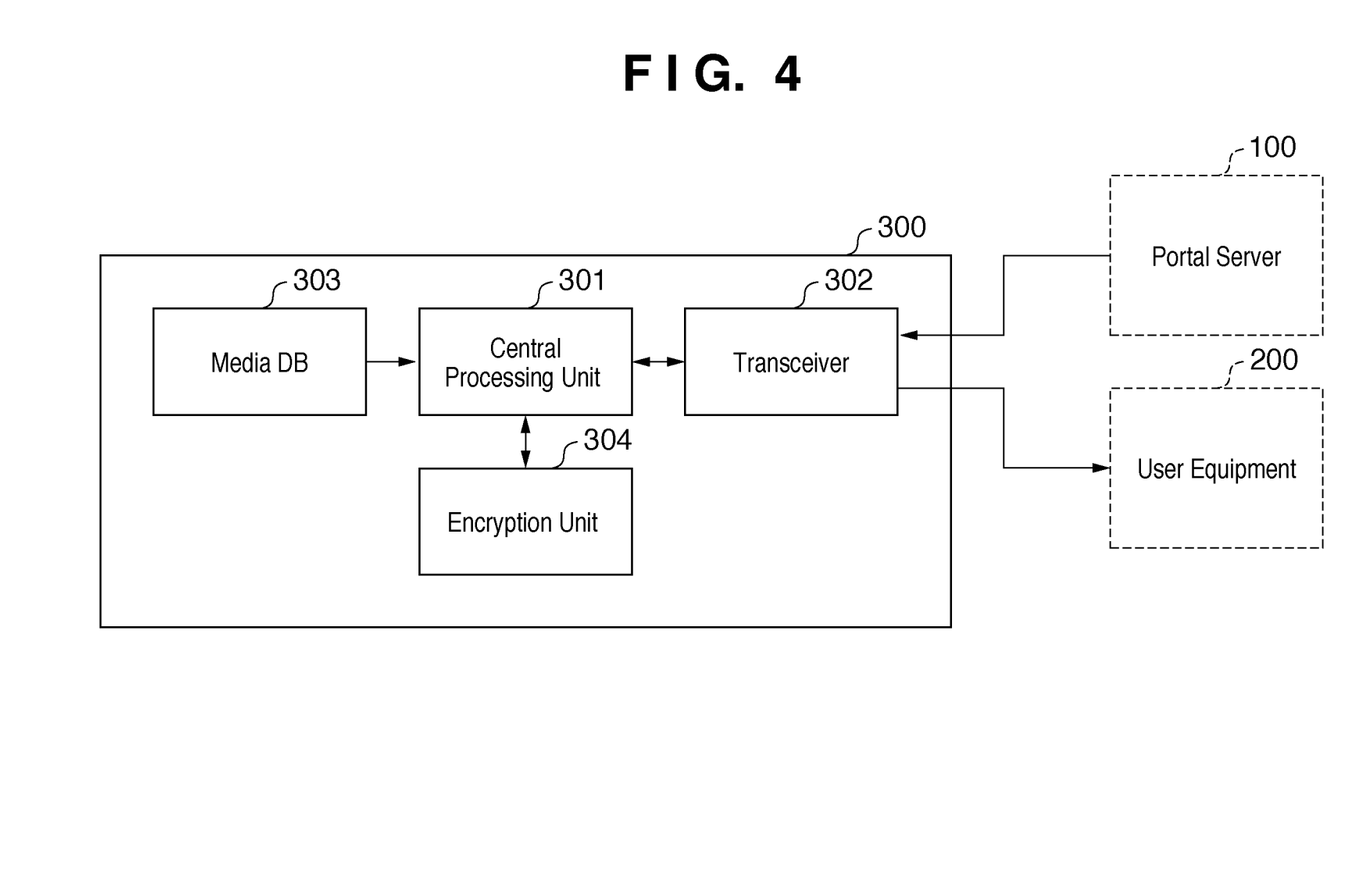
FIG. 4 illustrates a block diagram showing an exemplified functional arrangement of the media server.

FIG. 4 illustrates a block diagram showing exemplified functional arrangement of the media server 300, which is given as a home server 300 in this embodiment. As shown in FIG. 4, the media server 300 includes a central processing unit (CPU) 301, a transceiver 302, a media database (DB) 303, and an encryption unit 304.

The CPU 301 is a functional element that is configured to perform various controls and processes of the media server 300. The CPU 301 of the media server 300 may execute a program loaded in a RAM and cooperate with the hardware, thereby implementing the functional elements 301 to 304 shown in FIG. 4. Some or all of the functional elements may be implemented by dedicated hardware, as a matter of course.

The transceiver 302 is a functional element that is configured to send to and/or receive from data external devices (including the portal server 100 and the UE 200) over traffic channels or control channels.

The media DB 303 is a functional element that is configured to store at least one media object to be distributed. Each media object in the media DB 303 is associated with its identifier.

The encryption unit 304 is a functional element that is configured to encrypt the media object to be distributed with the session key received from the portal server 100, so that it is ensured that only the one-time player in which the same session key is embedded can decrypt the encrypted media object.

(RG/HIGA)

Figure 5:
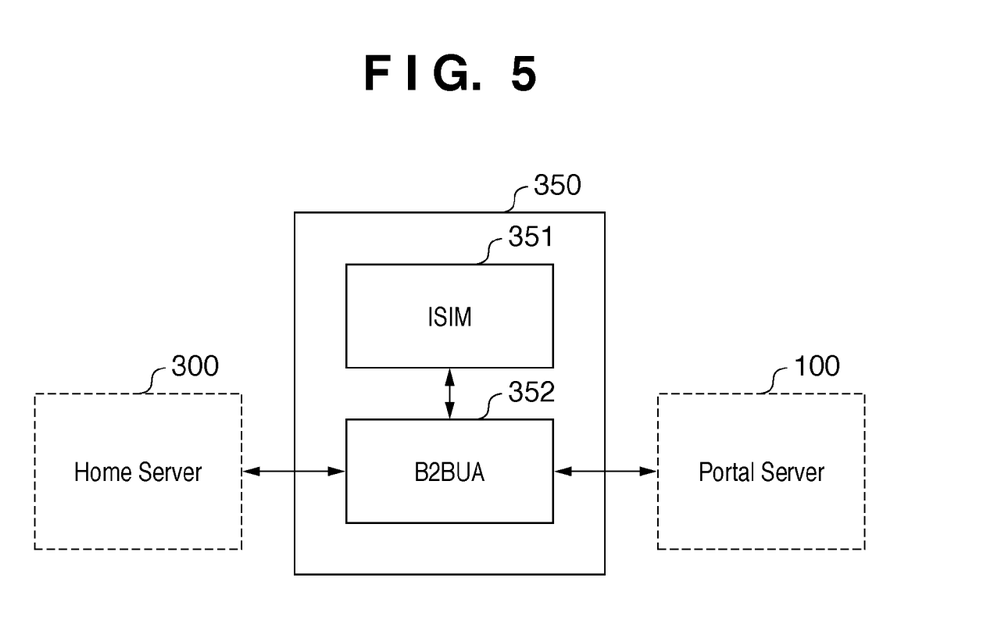
FIG. 5 illustrates a block diagram showing an exemplified functional arrangement of the RG/HIGA.

FIG. 5 illustrates a block diagram showing an exemplified functional arrangement of the RG/HIGA 350. As shown in FIG. 5, the RG/HIGA 350 includes at least one IMS Subscriber Identity Module applications (ISIMs) 351 and a B2BUA 352

The CPU (Central Processing Unit) of the RG/HIGA 350 may execute a program loaded in a RAM and cooperate with the hardware, thereby implementing the functional elements 351 to 352 shown in FIG. 5. Some or all of the functional elements may be implemented by dedicated hardware, as a matter of course.

The ISIM 351 stores an IMS Private Identity (IMPI) for respective non-IMS terminals as well as at least one IMS Public Identity (IMPU) for respective non-IMS terminals. The B2BUA 352 handles IMS signaling on behalf of non-IMS terminals such that all signaling concerning respective non-IMS terminals is associated with the corresponding IMPI on the ISIM 351. For example, if a non-IMS terminal sends a SIP REGISTER message to the RG/HIGA 350, the B2BUA 352 translates the message into an IMS REGISTER message that contains both an IMPI and an IMPU corresponding to the non-IMS terminal. Thus, the RG/HIGA 350 acts as an IMS terminal on behalf of the non-IMS terminal, thereby enabling the non-IMS terminal to access the IMS network 450.

(Media Distribution Flow)

Figure 6:
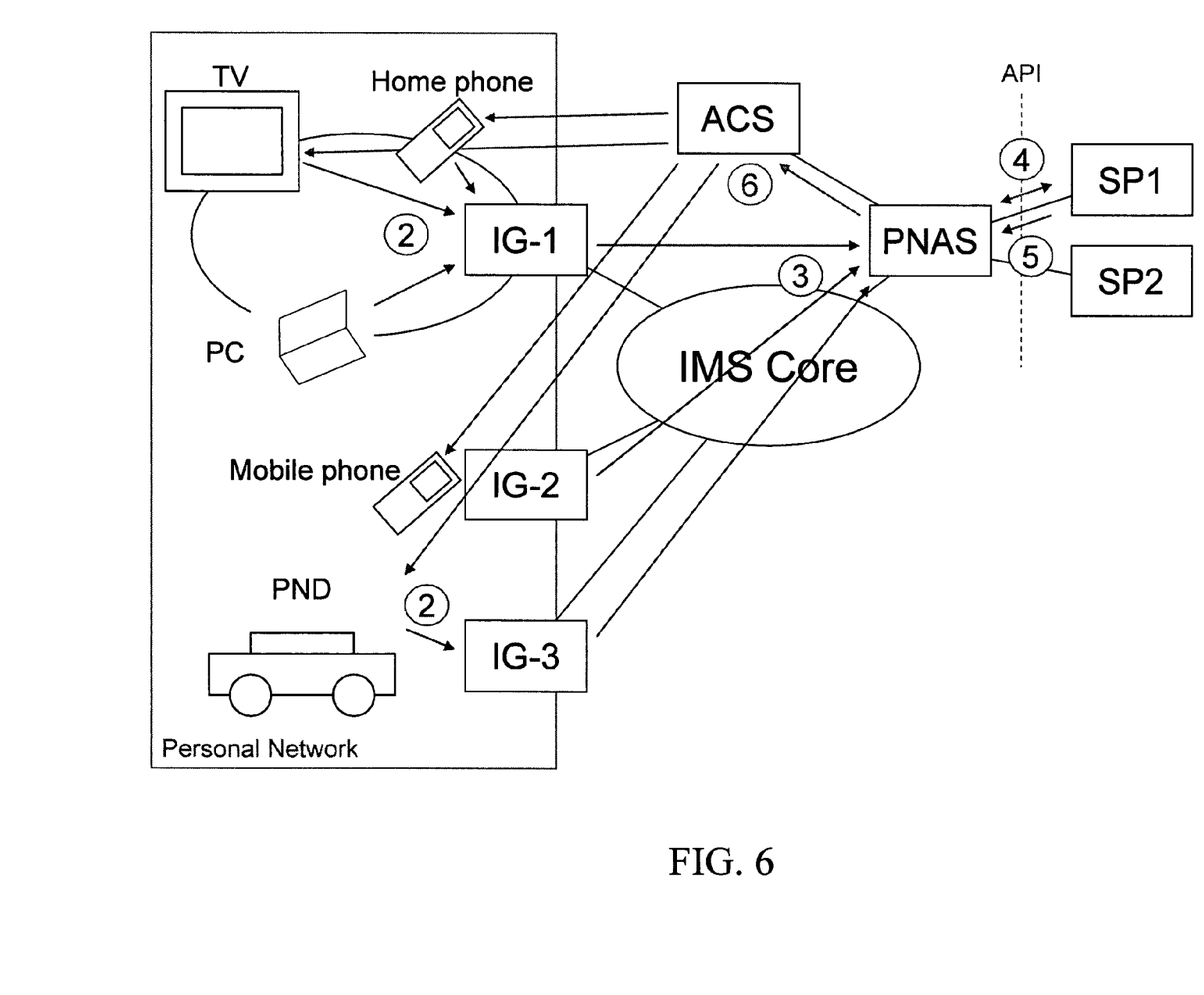
FIG. 6 is a sequence diagram showing the process by which a media object is distributed to the user equipment.

FIG. 6 is a sequence diagram showing the process whereby a media object is distributed to the UE 200. In the processing scenario, IMS signaling is leveraged although the full signaling flows are not shown.

In step S101, the UE 200 sends a request for a media object toward the home server 300. This request may be transmitted for example using a HTTP GET or a SIP INVITE. Note that the request may include information that specifies the capability of the UE 200 so that the portal server 100 can generate the one-time player that is adapted to the capability specified by the information. The detail of generating such a "tailored player" is to be described hereinafter.

The request is intercepted by the portal server 100, which will negotiate the session key that is to be applied to this session. As described previously, the portal server 100 is an IMS AS including a B2BUA, which intermediates between the UE 200 and the RG/HIGA 350.

Upon receiving the request for a media object from the UE 200, the portal server 100 then verifies the authenticity of the request. When the portal server 100 receives the request (for example an HTTP GET request), the requester ID is used to perform the verification. If the ID is a P-Asserted-Identity, which means the UE 200 has been already authenticated by the IMS core 400, then the process proceeds to step S106.

If the ID is an IP address, this IP address is looked up in the S-CSCF of the IMS core 400 and the authenticity of the address is verified. That is, the portal server 100 sends to a SCSF in the IMS core 400 a request message "Verify ID" for verifying the authenticity of the IP address (in step S102). If the authenticity is successfully verified, the IMS core 400 sends back a "Verify ID OK" message to the portal server 400 (step S103).

When the portal server 100 receives the "Verify ID OK" message, policies and security assertions are set up. In step S104, the portal server 100 sends a "SIP INVITE" to the UE 200 together with a nonce (a random number), or other challenge such as SPI (Security Parameter Index, which is used in Internet Protocol Security: IPSEC), Lifetime (time-to-live) or the like. It should be noted that the "SIP INVITE" contains a Call-Info field, which contains an HTTP URI of the media object, and a "purpose" field with "push" as the parameter. In this way, the HTTP URI, which refers to the content to be retrieved from the server, is pushed to the UE 200 using the SIP INVITE message. This is not defined in the current SIP specification, but can be implemented without much effort. If the UE 200 receives the "SIP INVITE" from the portal server 100, then the UE 200 sends back a "SIP 200 OK" with the same nonce (or other similar token used) to the portal server 100 (S105). Then the process proceeds to step S106.

In the step S106, the portal server 100 generates a session key using one of known key generation algorithms. The session key is unique to this session.

Then, in the step S107, the portal server 100 forwards the session key to the home server 300 using a SIP INVITE message. The session key is to be used as an encryption key by the home server 300. The connection between the portal server 100 and the RG/HIGA 350 is secured and authenticated by the IMS core 400, and the connection between the home server 300 and the RG/HIGA 350 is assumed to be in a trusted domain. Therefore, the transmission of the session key is secure.

In step S108, the portal server 100 generates a one-time player for media access, into which the session key that is generated in the step S106 is embedded. The session key is to be used as a decryption key by the UE 200. The session key is embedded in the one-time player in such a way that it cannot be easily extracted. As mentioned previously, the one-time player can be for example a Java applet.

The "one-time" functionality means that the one-time player can play back the requested media object that is associated with the session key only one time. That is, the one-time player is to be automatically disabled after expiry of the current session. Accordingly, it is ensured that the digital media in the media distribution system 501 is neither reusable nor redistributable after the expiry of the current session.

Note that the one-time player may be tailored to the device characteristics of the UE 200. In the request for the media object, wherein the device capability information is described using SIP SDP (Session Description Protocol), the portal server 100, may be notified of the device capability information, which specifies the device characteristics of the UE 200. Alternatively, the media distribution system 501 may include a database that stores device capability information for each UE 200, and the portal server 100 may retrieve the information for the requesting UE 200 from the database. The device capability information may include specification data for each component of the UE 200, for example, CPU speed, memory size, storage size, display size, display color, and/or the like.

Upon retrieving the device capability information, the portal server 100 may generate a one-time player that is adapted to the capability specified by the information. For example, the portal server 100 may select the most suitable one-time player from a plurality of prepared one-time players, and embed the session key into the selected one-time player. Accordingly, the mechanism enables the creation of a tailored player, which can be adapted to the capabilities of the user equipment device.

Then, the portal server 100 pushes the generated one-time player to the UE 200. The push can be a SIP push, HTTP POST, WAP (Wireless Application Protocol) Push or other suitable operation. For example, if the portal server 100 sends the SIP INVITE in step S104, the transmission of the one-time player may be fetched from the portal server 100 in response to an HTTP GET, which is triggered by the UE 200 in response to receiving the SIP INVITE. According to another example, the push may be a FLUTE transmission (see RFC 3926). In this case, the required parameters (refer to chapter 6 of RFC 3926) may be transmitted in the SIP 200 OK message. Note that since FLUTE does not contain a confirmation message, this confirmation should be added separately, that is, by sending a SIP 200 OK or a separate SIP MESSAGE with equivalent contents to confirm the transmission. According to still another example, the push may be an HTTP POST as shown in step S109. This can be triggered by the reception of the SIP 200 OK from the UE 200. If the UE 200 receives the HTTP POST in step S109, the UE 200 sends back to the portal server 100 a HTTP OK as a confirmation in step S110.

When the portal server 100 receives confirmation of successful reception of the pushed one-time player, it notifies the home server 300 using a SIP INVITE message (step S111).

Upon receiving the confirmation, the home server 300 uses the session key to encrypt the request media object file or stream (step S112). The encryption algorithm for use can be selected from any publicly known symmetric key encryption algorithm, including AES (Advanced Encryption Standard), 3DES (triple Digital Encryption Standard), or the like. The encrypted file format may include proprietary file formats, extensions, or the like.

The encrypted file is sent from the home server 300 to the UE 200 as a response to the original request (for example HTTP GET in step 101, or INVITE, etc.) so that the one-time player is able to decrypt it. In an example shown in FIG. 6, the portal server 100 sends the request HTTP GET for the object to the home server 300 in behalf of the UE 200 in step S113, and in response to the request the home server 300 sends the requested media object, encrypted, to the UE 200.

In step S115, the UE 200 decrypts the encrypted media object that is sent from the home server 300, decodes it, and plays it back for the user.

Because the "one-time" characteristic mandates that the one-time player be automatically disabled after expiry of the current session, when the session has expired, and the user wants to view the media object again, the process must be repeated to receive a new player.

(Processing of Portal Server)

Figure 7:
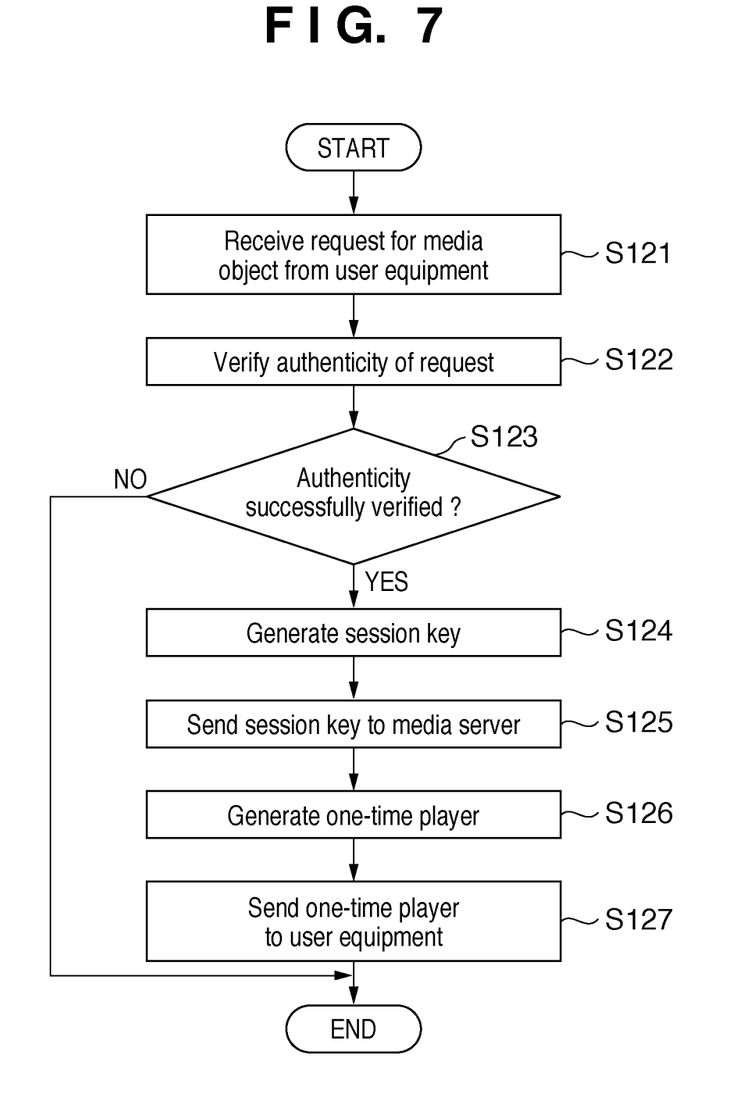
FIG. 7 is a flow chart showing the process performed by the portal server.

FIG. 7 is a flow chart showing the process performed by the portal server 100. Each step described below is performed based on the control of a CPU comprised by the portal server 100.

In step S121, the portal server 100 receives a request for a media object from the UE 200.

In step S122, the portal server 100 verifies the authenticity of the request. The authenticity of the request may be verified by interacting with a CSCF in the IMS network 450. If the authenticity is successfully verified, the process proceeds to step S123 (YES in step S123), else the process ends.

In step S124, the portal server 100 generates a session key using a known random number generation algorithm, wherein the session key is associated with the current session.

In step S125, the portal server 100 sends the session key to the home server 300 (corresponding to a media server), so that the home server 300 encrypts the requested media object with the session key and sends the encrypted media object toward the UE 200.

In step S126, the portal server 100 generates a one-time player that the session key is embedded into and which is not easily extracted from the player.

In step S127, the portal server 100 sends the one-time player to the UE 200, which enables the UE 200 to decrypt and decode the encrypted media object that is sent from the home server 300.

Note that the sequence of the steps may be substituted. For example, the portal server 100 may send the session key to the media server 300 (step S125) after generating the one-time player (step S126).

As described above, the encryption mechanism for the DRM is tied to the current session (SIP or IMS session, as described above), as computed by the portal server 100 in step S106 in FIG. 6 and step S124 in FIG. 7. This ensures that copies of the media cannot be replayed without a renewed download of the client.

Because the model ensures that the media object is not re-usable after expiry of the current session, and because the media object is encrypted with a key which expires when the session expires, the model encourages the use of time-based licenses (i.e., lending of copyright), which are better suited to the digital domain for many media producers and consumers, as opposed to outright sale.

In addition, it should be noted that, the embodiment above allows for the re-use of the same DRM mechanism regardless of the format of the media, since the DRM encoding and decoding (i.e., encryption algorithm) are applied without regard to the media encoding format.

Furthermore, according to the embodiment above, a player is pushed to the user equipment device for each session, which means that no previous player of this type need be installed in the UE 200 in advance. Also, as described above, the player may be tailored to the capability of the UE 200.

Other Embodiments

Figure 8:
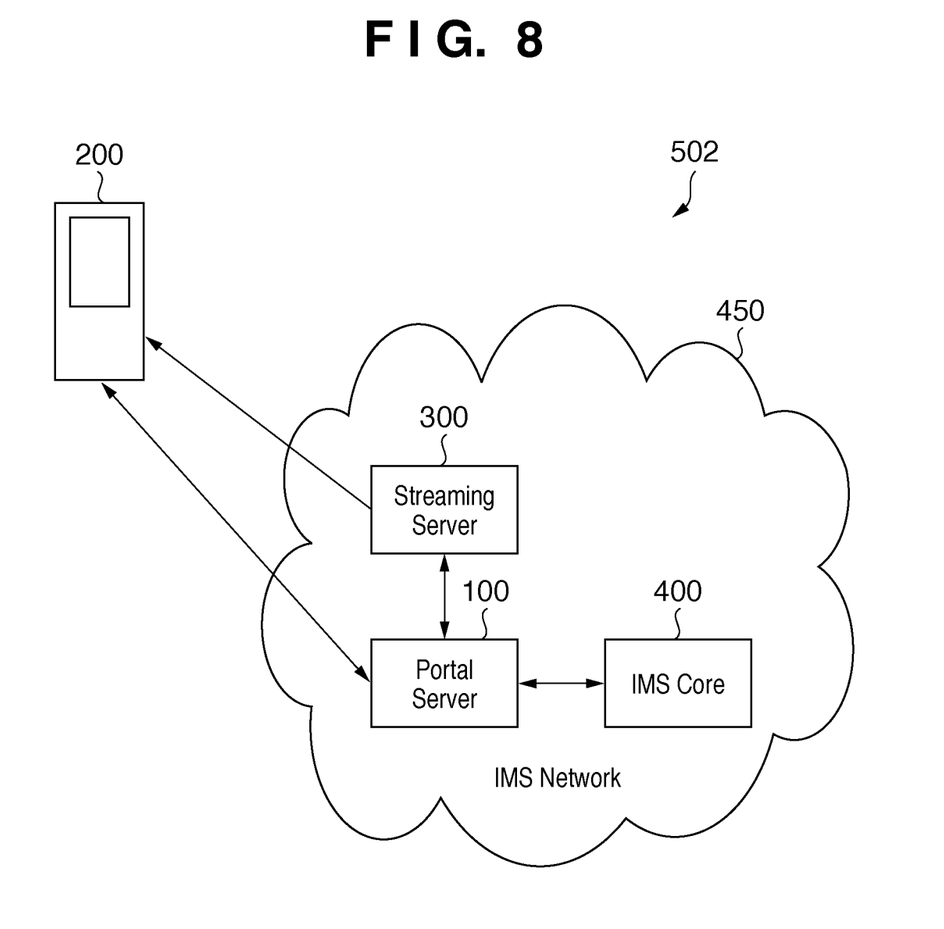
FIG. 8 illustrates another exemplified media distribution system.

The embodiment described above assumes a residential network scenario, but it is not necessary to implement the media server 300 as a home server. For example, the media server 300 may be a streaming server 300 in a network. FIG. 8 illustrates an exemplified media distribution system 502 according to another embodiment of the present invention. Unlike the embodiment assuming a residential network scenario, in this embodiment, a streaming server 300 in a network operates as the media server for distributing the media object to the user equipment (UE) 200, and the communication between the streaming server 300 and the portal server 100 is not intermediated by the RG/HIGA.

The functional arrangement of the streaming server 300 is same as that of the home server 300 in the first embodiment. Similarly, the functional arrangements of the portal server 100 and the UE 200 are same as those in the first embodiment.

Figure 9:
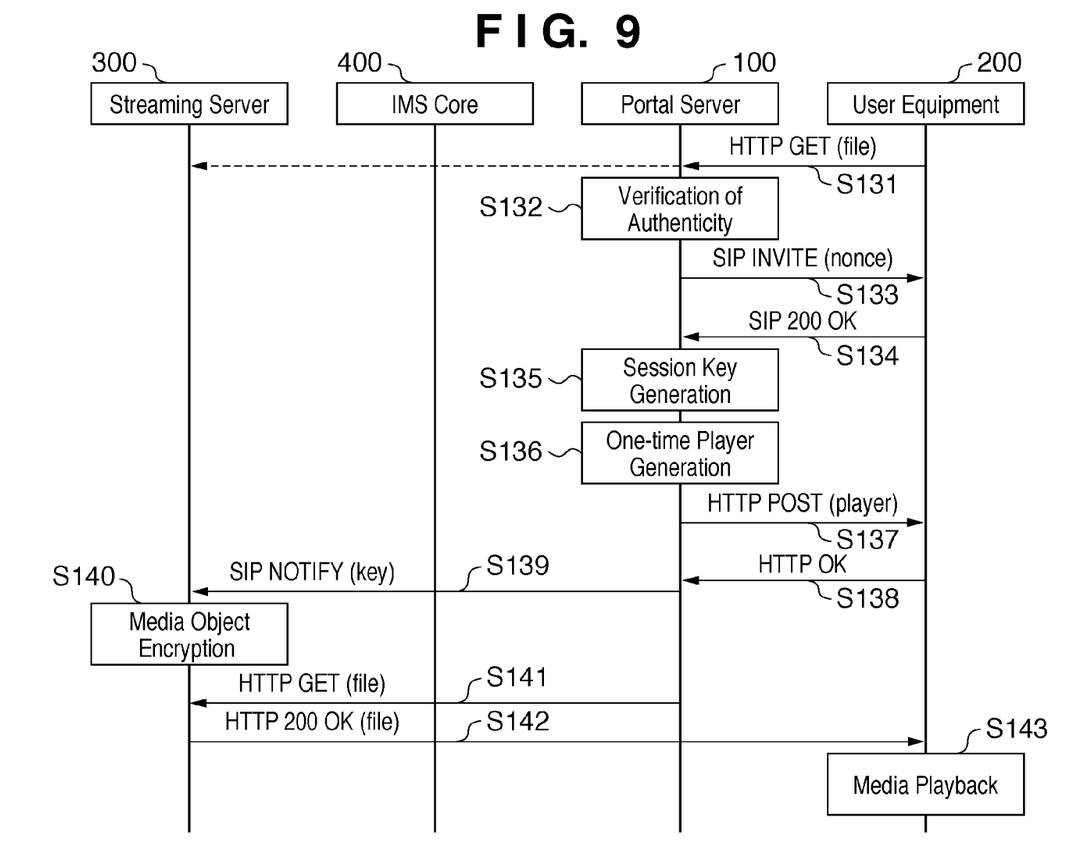
FIG. 9 is a sequence diagram showing the process by which a media object is distributed to the user equipment.

FIG. 9 is a sequence diagram showing the process whereby a media object is distributed to the UE 200. Similar to FIG. 6, IMS signaling is leveraged in the processing scenario although the full signaling flows are not shown.

The process at steps S131 is similar to that in step S101 in FIG. 6. On receiving a request for a media object, the portal server 100 verifies the authenticity of the request in step S131. The verification may be processed as described above. The steps S133 to S143 are almost same as the steps S104 to S110 and S112 to S115 in FIG. 6. FIG. 6 and FIG. 9 are different in that, in FIG. 9, the session key is sent to the streaming server 300 (S139) after the one-time player has been generated and the streaming server 300 encrypts the media object upon receiving the session key.

According to the above embodiment even when not assuming the residential network scenario, similar to the first embodiment, it is ensured that the digital media is neither re-usable nor redistributable in an IMS-based media distribution system after expiry of the IMS session.

In the above embodiments the portal server 100 sends the session key and the one-time player separately to the UE 200, but the key and the player may be combined to form a single file and sent to the UE 200. That is, the portal server 100 may act as a proxy and attach the one-time player to the media object file when it is delivered from the streaming server 300.

The embodiments of the present invention have been described in detail above. However, aside from a computer apparatus, communication terminal, or the like, it is possible for the embodiment to involve a method in which a computer executes the above processing or as a program or a storage medium in which the program is stored.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A media distribution system comprising:
an application server comprising:
receiving means for receiving a request for a media object from a user equipment,
verification means for verifying the authenticity of the received request,
first generation means for generating a session-dependent key that is associated with a current session when the authenticity of the request is successfully verified,
first sending means for sending the session-dependent key from the application server to a media server, wherein said media server encrypts the requested media object with the session-dependent key and sends the encrypted media object toward the user equipment,
second generation means for generating a one-time player in which the session-dependent key is embedded wherein the one-time player can play back the requested media object that is associated with the session-dependent key only one time, and
second sending means for sending the one-time player from the application server to the user equipment, which enables said user equipment to decrypt and decode the encrypted media object that is sent from the media server.

2. The media distribution system according to claim 1, wherein the request from the user equipment includes information that specifies the capability of said user equipment, and
wherein the second generation means generates the one-time player that is adapted to the capability specified by the information.

3. The media distribution system according to claim 1, further comprising:
second receiving means for receiving the media object encrypted by the media server from said media server, and
wherein the second sending means attaches the one-time player to the received encrypted media object, and sends said media object with said one-time player to the user equipment.

4. The system of claim 1, wherein the application server, the media server and the user equipment are physically separate and remotely connected devices.

5. The system of claim 1, wherein said media server is in a location remote from the application server, and wherein said media server sends the encrypted media object toward the user equipment over a network according to an internet protocol (IP) address of the user equipment.

6. The system of claim 1, wherein the receiving means comprises an intercepting means for intercepting the request for a media object intended for the media server.

7. The media distribution system according to claim 1 wherein the media server and the user equipment are coupled through a remote connection, and wherein the media server and the application server are remotely coupled through a network gateway so that the session-dependent key is sent from the application server through the network gateway to the media server.

8. The media distribution system according to claim 7 wherein the user equipment is a mobile device, wherein the media server and the user equipment are coupled through the remote connection over a wireless link.

9. The media distribution system according to claim 1, wherein the application server intermediates between the user equipment and the media server through a multimedia gateway for delivering internet protocol (IP) multimedia services that allows non-media servers to access the multimedia gateway.

10. The media distribution system according to claim 9, wherein the verification means verifies the authenticity of the request by interacting with a session initiation protocol (SIP) server coupled to the multimedia gateway and configured to control sessions established between terminals in SIP communication and the application server to initiate certain services.

11. A method for controlling a media distribution system comprising:
receiving a request for a media object at an application server from a user equipment;
verifying the authenticity of the received request;
generating a session-dependent key that is associated with a current session when the authenticity of the request is successfully verified;
sending the session-dependent key from the application server to a media server, wherein said media server encrypts the requested media object with the session-dependent key and sends the encrypted media object toward the user equipment;
generating a one-time player in which the session-dependent key is embedded wherein the one-time player can play back the requested media object that is associated with the session-dependent key only one time; and
sending the one-time player from the application server to the user equipment, which enables said user equipment to decrypt and decode the encrypted media object that is sent from the media server.

12. The method according to claim 11, wherein the request from the user equipment includes information that specifies the capability of said user equipment, and
wherein the generating a one-time player comprises generating a one-time player that is adapted to the capability specified by the information.

13. The method according to claim 11, further comprising receiving the media object encrypted by the media server from said media server, and
wherein, in the sending the one-time player comprises attaching the one-time player is to the received encrypted media object, and sending said media object with said one-time player to the user equipment.

14. The method according to claim 11, wherein, in the generating the one-time player comprises generating the one-time player that is to be automatically disabled after the expiry of the existing session is generated.

15. The method of claim 11, wherein the application server, the media server and the user equipment are physically separate and remotely connected devices.

16. The method of claim 11, wherein the media server is in a location remote from the application server, and wherein the media server sends the encrypted media object toward the user equipment over a network according to an internet protocol (IP) address of the user equipment.

17. The method according to claim 11, wherein the receiving comprises intercepting the request for a media object intended for the media server.

18. The method according to claim 11, wherein the generating includes selecting a one-time player from a plurality of one-time players based on a plurality of capabilities of the user equipment.

19. The media distribution system according to claim 11 wherein the media server and the user equipment are coupled through a remote connection, and wherein the media server and the application server are remotely coupled through a network gateway so that the session-dependent key is sent from the application server through the network gateway to the media server.

20. The media distribution system according to claim 19 wherein the user equipment is a mobile device, wherein the media server and the user equipment are coupled through the remote connection over a wireless link.

21. The method according to claim 11, further comprising:
intermediating between the user equipment and the media server through a multimedia gateway for delivering internet protocol (IP) multimedia services that allows non-media servers to access the multimedia gateway.

22. The method according to claim 21, wherein the verifying step further comprises verifying the authenticity of the request by interacting with a session initiation protocol (SIP) server coupled to the multimedia gateway and configured to control sessions established between terminals in SIP communication and the application server to initiate certain services.

23. A computer program product, comprising:
a tangible computer readable storage medium having computer readable program code embodied in the medium that when executed by a processor causes the processor to perform operations comprising:
receiving a request for a media object from a user equipment;
verifying the authenticity of the received request;
generating a session-dependent key that is associated with a current session when the authenticity of the request is successfully verified;
sending the session-dependent key from an application server to a media server, wherein said media server encrypts the requested media object with the session-dependent key and sends the encrypted media object toward the user equipment;
generating a one-time player in which the session-dependent key is embedded, wherein the one-time player can play back the requested media object that is associated with the session-dependent key only one time; and
sending the one-time player from the application server to the user equipment, which enables said user equipment to decrypt and decode the encrypted media object that is sent from the media server.

* * * * *

UNITED STATES PATENT AND TRADEMARK OFFICE
CERTIFICATE OF CORRECTION

PATENT NO. : 8,433,907 B2  
APPLICATION NO. : 13/061882  
DATED : April 30, 2013  
INVENTOR(S) : Hjelm et al.

Page 1 of 1

It is certified that error appears in the above-identified patent and that said Letters Patent is hereby corrected as shown below:

In the Specification

In Column 6, Line 3, delete "1061" and insert -- 106. --, therefor.

In Column 6, Line 64, delete "352" and insert -- 352. --, therefor.

In Column 7, Line 49, delete "server 400" and insert -- server 100 --, therefor.

In the Claims

In Column 12, Line 21, in Claim 11, delete "system" and insert -- system, --, therefor.

In Column 12, Line 53, in Claim 13, delete "is to" and insert -- to --, therefor.

Signed and Sealed this
Eighth Day of October, 2013

Teresa Stanek Rea
*Deputy Director of the United States Patent and Trademark Office*